US007870739B2

(12) United States Patent
Bland

(10) Patent No.: US 7,870,739 B2
(45) Date of Patent: Jan. 18, 2011

(54) GAS TURBINE ENGINE CURVED DIFFUSER WITH PARTIAL IMPINGEMENT COOLING APPARATUS FOR TRANSITIONS

(75) Inventor: Robert J. Bland, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1576 days.

(21) Appl. No.: 11/345,725

(22) Filed: Feb. 2, 2006

(65) Prior Publication Data

US 2007/0175220 A1 Aug. 2, 2007

(51) Int. Cl.
*F02C 1/00* (2006.01)

(52) U.S. Cl. .......................................... 60/760; 60/752

(58) Field of Classification Search .................. 60/751, 60/752–760, 39.37; 415/169.1, 144, 145
See application file for complete search history.

(56) References Cited

U.S. PATENT DOCUMENTS 3,652,181 A 3/1972 Wilhelm, Jr.
4,211,069 A 7/1980 Kalbfuss
4,236,378 A 12/1980 Vogt
4,244,178 A 1/1981 Herman et al.
4,255,927 A * 3/1981 Johnson et al. ............ 60/39.23
4,291,531 A * 9/1981 Campbell ................ 60/39.511
4,297,842 A * 11/1981 Gerhold et al. ............... 60/776
4,297,843 A * 11/1981 Sato et al. ..................... 60/796
4,314,443 A * 2/1982 Barbeau ...................... 60/804
4,339,925 A 7/1982 Eggmann et al.
4,719,748 A * 1/1988 Davis et al. ................ 60/39.37
4,903,477 A 2/1990 Butt
5,363,653 A 11/1994 Zimmermann et al.
5,557,921 A * 9/1996 Frutschi et al. ............ 60/39.53
5,737,915 A 4/1998 Lin et al.
5,906,093 A 5/1999 Coslow et al.
5,918,467 A 7/1999 Kwan
6,279,322 B1 8/2001 Moussa
6,334,297 B1 * 1/2002 Dailey et al. .................. 60/785
6,412,268 B1 7/2002 Cromer et al.
6,484,505 B1 11/2002 Brown et al.
6,536,201 B2 3/2003 Stuttaford et al.
6,568,187 B1 5/2003 Jorgensen et al.
6,672,070 B2 1/2004 Bland et al.
2003/0010014 A1 * 1/2003 Bland et al. ................ 60/39.37
2005/0241317 A1 * 11/2005 Martling et al. ............... 60/772
2007/0271923 A1 * 11/2007 Dawson ....................... 60/751

* cited by examiner

*Primary Examiner*—William H Rodríguez
*Assistant Examiner*—Gerald L Sung

(57) ABSTRACT

A curved diffuser (210) in a gas turbine engine (201) directs a primary portion of air flow from a compressor (202) through a curved discharge opening (213) into a plenum (220). The curved diffuser (210) also comprises ports (217) through which a secondary portion of air passes into confined space (225) that is defined in part by a pressure boundary element that may be comprised of at least one plate (222) or at least one conduit (306). The at least one plate (222) and the at least one conduit (306) respectively comprise apertures (246, 312) through which pass the secondary portion of air to provide impingement-type cooling to transitions (230, 320). In various embodiments the velocity of the air between adjacent transitions (230, 320) may flow at relatively uniform velocity along the longitudinal distance of the respective transitions (230, 320).

13 Claims, 5 Drawing Sheets

GAS TURBINE ENGINE CURVED DIFFUSER WITH PARTIAL IMPINGEMENT COOLING APPARATUS FOR TRANSITIONS

FIELD OF THE INVENTION

The invention generally relates to a gas turbine engine with a compressor for supplying air. More particularly, it relates to an assemblage of components providing compressed air in a can-annular combustion chamber arrangement, where a portion of the air is directed for cooling transitions.

BACKGROUND OF THE INVENTION

In gas turbine engines air usually is compressed at an initial stage, then is heated in combustion chambers, and the hot gas so produced drives a turbine that does work, including rotating the compressor.

To achieve a good overall efficiency in a gas turbine engine, one consideration is the reduction of losses of air pressure, such as due to friction and turbulence, between the air compressor and the intakes of the combustion chambers. In a common gas turbine engine design, compressed air flows from the air compressor, through a diffuser, into a plenum in which are positioned transitions and other components, and then from the plenum into the intakes of combustion chambers.

One general approach to improve airflow efficiency in the plenum, and thereby improve overall efficiency, is to modify the end of the diffuser so as to redirect air more radially outward. For example, a curved diffuser may be employed wherein the outlet end has a bend that directs the airflow radially outward, instead of axially aft. Conceptually this may provide 1) a more direct, flow-efficient route to the combustion chamber intakes, and 2) less travel and turbulence/losses in the parts of the plenum where the mid-sections and aft ends of the transitions are located.

However, radial diversion of a substantial portion of compressed air, without more, may present a problem when the airflow from the compressor has been used, or is desired to be used, to cool the transitions. Generally, transition cooling may be effectuated fully or partially by any of the following, which represents a non-exclusive list: closed circuit steam cooling (i.e., see for one example U.S. Pat. No. 5,906,093); open air cooling (in which a portion of the compressed air passes through channels in the transition and then enters the flow of combusted gases within the transition, see for one example U.S. Pat. No. 3,652,181); convection cooling (see for one example U.S. Pat. No. 4,903,477); effusion cooling (i.e., conveying air from outside the transition through angled holes into the transition); channel cooling (i.e., conveying air from outside the transition, through channels in the transition walls, and into the transition); and impingement cooling (where air is directed at the transition exterior walls through apertures positioned on plates or other structures close to these walls, see U.S. Pat. No. 4,719,748 for one example). It also is noted that some of these approaches may be used in combination with one another.

Notwithstanding the features of current cooling approaches, when compressor air is desired to cool the transition, and when a more efficient design, such as a curved diffuser, is desired for airflow, there is a need for an appropriately designed combination of airflow-directing elements to attain a reliable, desired balancing of overall airflow efficiency and of transition cooling. As disclosed in the following sections, the present invention provides airflow-directing assemblages that are effective to achieve this desired balance.

That is, the present invention advances the art by solving the dual, potentially conflicting issues of cooling of transitions and conservation of airflow and pressure to the combustion chambers.

BRIEF DESCRIPTION OF THE DRAWINGS

The foregoing and other features of the invention will be apparent from the following more particular description of the invention, as illustrated in the accompanying drawings.

DETAILED DESCRIPTION OF EXEMPLARY EMBODIMENTS

Figure 1:
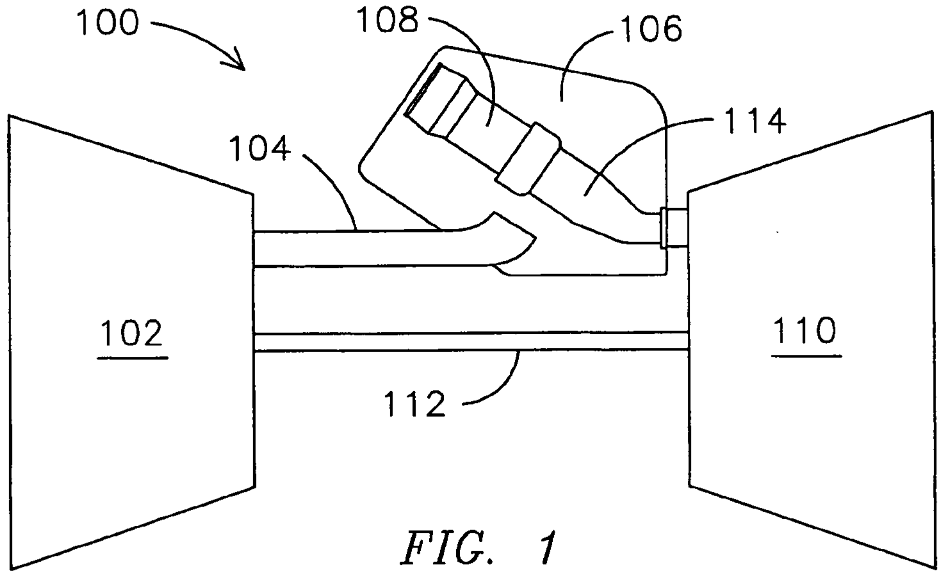
FIG. 1 is a schematic depiction of a gas turbine engine such as may comprise various embodiments of the present invention.

The present invention addresses the problems related to balancing the cooling of transitions of a gas turbine engine and efficient airflow through a plenum in which are positioned those transitions. These problems are solved with an assemblage of components adapted to provide a primary portion of air from the compressor efficiently directed to the intakes of the combustion chambers and a lesser, secondary portion of air directed to cool the transitions. One component comprises a diffuser comprising a arcuate surface, for example a curved outlet end, that directs the primary portion (taken to mean over 50 percent of the total flow) of the compressed air radially outwardly, and that also comprises a plurality of spaced-apart ports. These ports are adapted to provide the secondary portion of the compressed air to a second component, for cooling of the transitions.

The second component comprises a pressure boundary element, which comprises an array of apertures disposed a distance from respective transitions to provide impingement cooling. The pressure boundary element has an upstream end disposed about the arcuate surface so as to define a confined space through which air of the secondary portion passes, from the ports through the apertures, to effectuate, during operation of the gas turbine engine, the aforementioned impingement cooling. Examples of the pressure boundary element include a flat plate or a curved plate (or a number of these arranged circumferentially) that comprise arrays of apertures, and a conduit (or a number of these arranged circumferentially) disposed between respective ports and transitions.

By the term "curved diffuser" is meant a diffuser comprising an arcuate surface at its outlet end effective to direct the airflow passing through the bend radially outward by at least 30 degrees relative to the longitudinal axis of the gas turbine engine, and preferably at least 45 degrees. The arcuate surface provides for a more direct routing of the primary portion of compressed air to the combustion chamber intakes.

However, as noted without more such curved diffuser would not provide for effective cooling of the transitions, particularly to those more aft transition areas that are not affected by this primary portion airflow. The discovery of the present invention was in part related to the realization that impingement cooling need not be effectuated by the orthodox approach of affixing impingement plate around a transition. This realization was combined with the strategies regarding improving performance by redirecting air with a curved diffuser, however, realizing that by providing ports through such diffuser a relatively smaller portion of air could be supplied to non-affixed impingement cooling structures to cool, at a minimum, lower (inboard) surfaces of the transition. This results in transitions that are not surrounded by affixed impingement cooling structures (these being affixed to the curved diffuser and other structures), which results in easier access for repairs and maintenance.

Thus, the provision of ports through the arcuate surface of the curved diffuser provides air to cool those more aft transition areas that are not affected by the primary portion airflow. This air flows through apertures in a pressure boundary element to provide impingement cooling. As noted above, this approach to cooling differs structurally from impingement cooling in which the impingement plates surround and are structurally connected to respective transitions. In some embodiments, the pressure boundary element comprises one or a plurality of plates arranged inboard of mid and aft sections of the transitions so as to be in sufficient proximity for impingement cooling. This pressure boundary element is supplied by the plurality of spaced-apart ports, which are positioned in the arcuate surface of the curved diffuser. Air flowing from these ports supplies this impingement cooling apparatus selectively by passing into a confined space defined in part by the arcuate wall and one or more of the plates in proximity to and inboard of the transitions. In other embodiments, conduits are in fluid communication with the ports and comprise arrays of apertures that provide for impingement cooling of the transitions. Such conduits are positioned so that the airflow from the apertures is effective to provide the impingement cooling to transitions.

The examples below thus demonstrate a functionally split air flow that is effective to direct air in the plenum in a collaborative manner so to provide adequate cooling without the losses (volume or pressure) associated with known arrangements of elements for directing air and cooling the transitions.

Differences between the present solution to the above-indicated problems and previous approaches may be summarized as follows. One previous approach may be exemplified by the teachings of U.S. Pat. No. 4,719,748, issued Jan. 19, 1988 to Davis et al. (the '748 patent). In the '748 patent, an axial diffuser would provide air substantially axially and downstream into a plenum in which are disposed transitions. An impingement sleeve surrounds each transition forming a channel. Apertures arranged in the impingement sleeve provide for air to pass into the channel to cool the respective transition. One feature is that the channel becomes wider at the upstream discharge end compared to the downstream, turbine end. The areas of the apertures closer to the upstream discharge end are larger than the areas of apertures (for a given surface area) closer to the downstream turbine end. This configuration is stated to provide an increased mass flow rate without requiring an increase in pressure drop. However, there is no provision for efficient passage and redirection of the substantial portion of air flowing from the compressor, and the form of impingement cooling is a shell closely conforming to the shape of, and thereby surrounding, the transition. The '748 patent also discloses film cooling apertures through which flow air from the plenum into the interior of the transition near the turbine end (more specifically, at the aft support).

Another previous approach, described in U.S. Pat. No. 5,737,915, issued Apr. 14, 1998 to Lin et al., depicts a curved diffuser in which a pair of baffles within the flow area of the curved diffuser divide the flow area into three discrete flow passages. This is stated to provide for " . . . uniform flow distribution along the impingement sleeve about the transition region and thus achieves desirable static pressure recovery." However, this baffled curved diffuser is stated to be used in a gas turbine that comprises an impingement sleeve surrounding a transition piece. Also, the stated objective is to more evenly distribute compressor discharge flow about the impingement sleeve. This does not present a solution such as the present invention that achieves greater efficiency of air flow and pressure to the combustion chamber intakes.

Having generally described the invention and differences between the present solution and previous approaches, the following embodiments are described, and are depicted in the figures so as to provide examples that include the best mode and that more fully explain various aspects of the invention. The following discussion also provides additional disclosure that further differentiates the invention from previous approaches and demonstrates how the invention more effectively and efficiently solves the above-stated problems.

FIG. 1 provides a schematic cross-sectional depiction of a gas turbine engine 100 such as may comprise various embodiments of the present invention. The gas turbine engine 100 comprises a compressor 102, a combustion chamber 108 (such as a can-annular combustion chamber), and a turbine 110. During operation, in axial flow series, compressor 102 takes in air and provides compressed air to a diffuser 104, which passes the compressed air to a plenum 106 through which the compressed air passes to the combustion chamber 108, which mixes the compressed air with fuel (not shown), providing combusted gases via a transition 114 to the turbine 110, which may generate electricity. A shaft 112 is shown connecting the turbine to drive the compressor 102. Although depicted schematically as a single longitudinal channel, the diffuser 104 extends annularly about the shaft 112 in typical gas turbine engines, as does the plenum 106. Modifications to the diffuser 104 and additions within the plenum 106 in accordance with the present invention are described in the following figures.

Figure 2C:
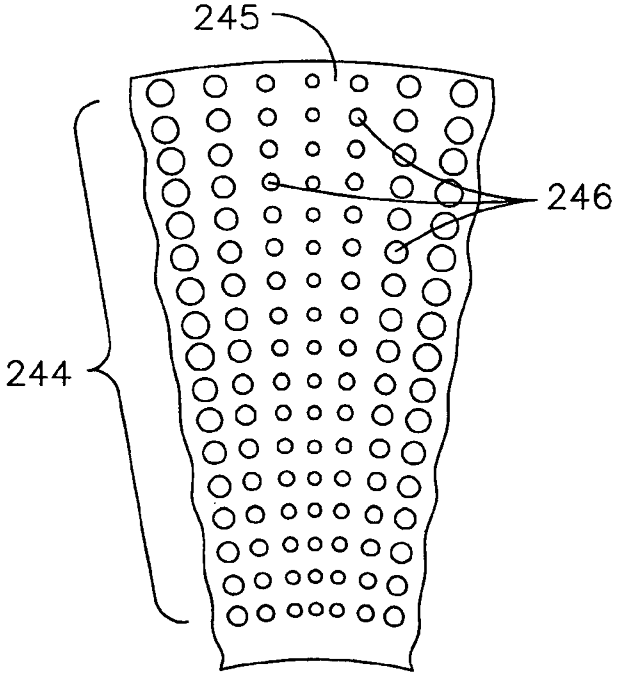
FIG. 2C provides a top outboard view of a portion of the plate depicted in FIGS. 2A and 2B that shows an array of apertures on the outboard surface.
Figure 2A:
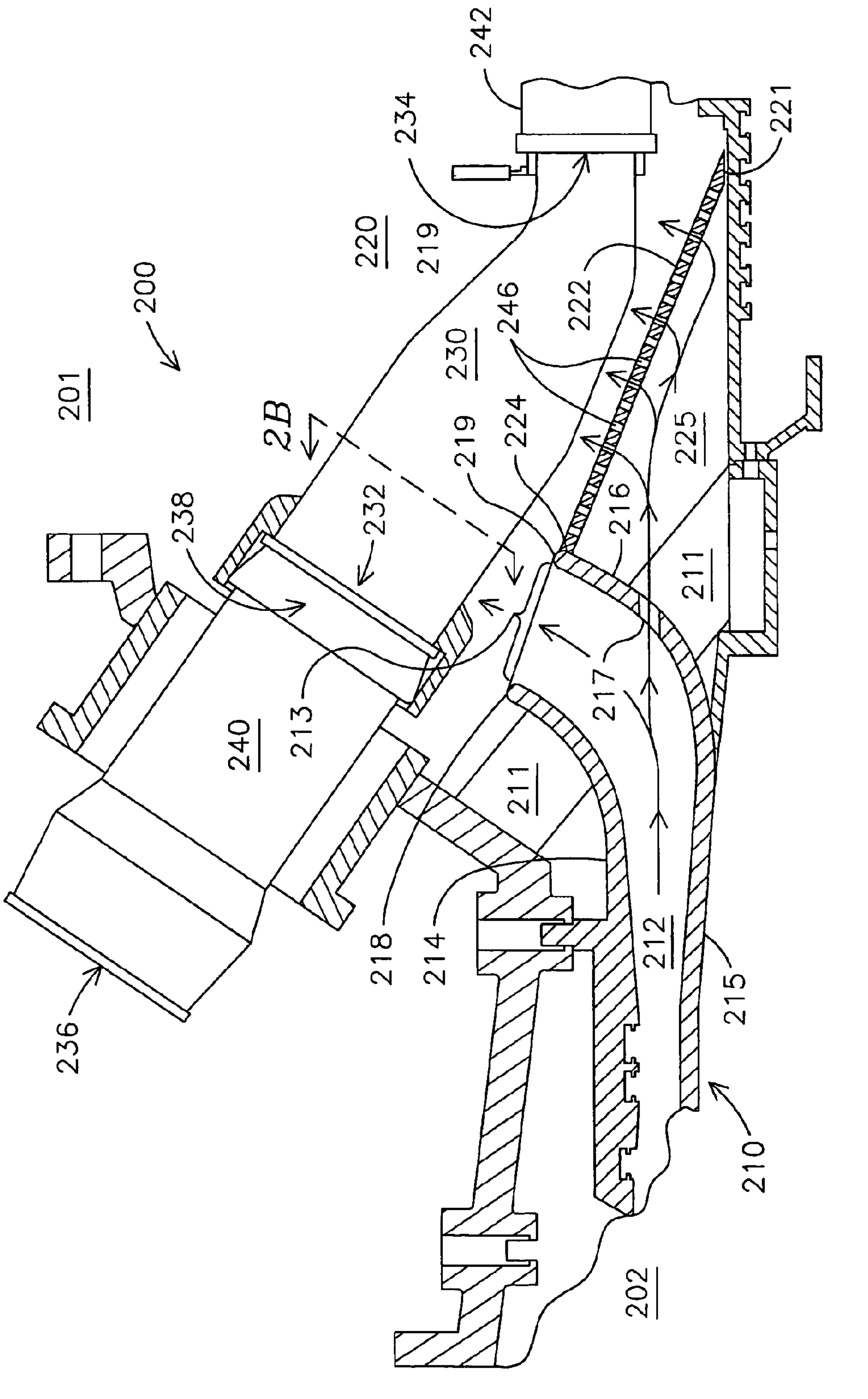
FIG. 2A is a cross-sectional view of a portion of the gas turbine engine depicted in FIG. 1, further depicting an embodiment of the present invention.

FIG. 2A provides a cross-sectional view of a portion 200 of a gas turbine engine 201 (not shown in its entirety) such as that represented in full in FIG. 1, however comprising features claimed herein. Airflow (indicated by arrows) may be tracked from a downstream end 202 of a compressor for air (not shown in full) through a diffuser 210, and into a plenum 220. Within the plenum 220 is positioned a transition 230 in need of cooling by air from the compressor 202 rather than by, or in addition to (such as with steam cooling to portions of the transition) other means. The transition 230 comprises a forward end 232, an aft end 234 (communicating to an intake 242 of a turbine, which is not shown in FIG. 2A), and inboard, outboard and lateral sides (see FIG. 2A). From the plenum 220 air continues to travel into an intake end 236 of a combustion chamber 240. An outlet end 238 of the combustion chamber 240 is disposed a distance within the forward end 232 of the transition 230. During operation hot, partially or fully combusted air flows from the outlet end 238 into the transition 230, and then such air enters the turbine at intake 242.

The diffuser 210 comprises an annular passage 212, defined by an outer wall 214 and an inner wall 215, that extends axially from the downstream end 202 of the compressor (not shown in full) to provide a passage for air to the plenum 220. Selectively, support struts 211 may be spaced apart contacting and supporting the diffuser 210, or other mechanical support structures (not shown in FIG. 2A) may be provided. These are spaced apart at intervals, such as one at every combustion chamber 240, so as to not adversely impact airflow from the diffuser 240. Also, deswirler elements (not shown in FIG. 2A) may be provided within or axially upstream of the annular passage 212. The inner wall 215 curves radially outwardly to form an arcuate wall 216 that extends into the plenum 220. In FIG. 2A the outward inflection of arcuate wall 216 is about 55 degrees. However, this is not meant to be limiting, and an outward inflection of such arcuate wall 216 may be in the range of about 20 degrees to about 60 degrees, or of about 40 degrees to about 60 degrees. A diffuser comprising such bend is found effective to direct a primary portion of air from the compressor to the intake end 236 of the combustion chamber 240. The outer wall 214 comprises a distal end 218 that, although depicted in FIG. 2A to comprise an extended outward curve, may be of other shapes. For example, not to be limiting, the length of such curved distal end 218 may be reduced to provide a larger diffuser discharge opening (represented by the distance 213).

Also, a port 217 is indicated along the arcuate wall 216. The port 217 is offset laterally from the struts 211. Disposed between an outer portion 219 of the arcuate wall 216 distal to the port 217 and a portion 221 of turbine structure forming the plenum 220 extends a plate 222 that provides a boundary for a secondary portion of air passing through the port 217. Passing through plate 222 are apertures 246. Aspects and relationships of the port 217 and the plate 222 are further depicted in FIG. 2B, the discussion of that figure also considering the view of FIG. 2A.

Figure 2B:
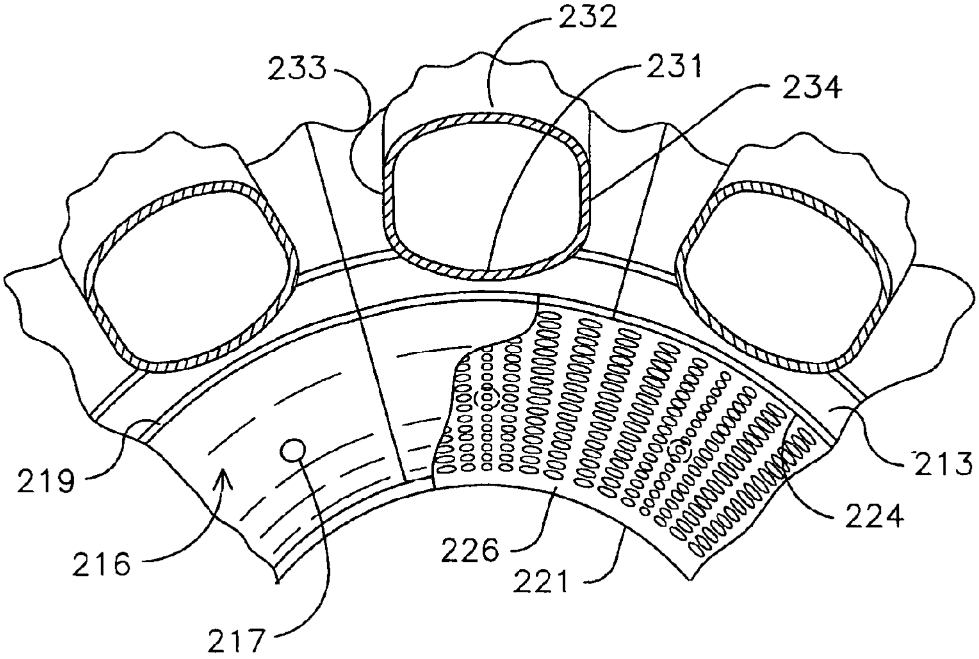
FIG. 2B provides a schematic upstream-directed view from the line A-A of FIG. 2A, with the transitions sectioned at line B-B of FIG. 2A, with a partial cut-away.

FIG. 2B provides a schematic upstream-directed view from the line A-A of FIG. 2A, with the transitions sectioned at line B-B of FIG. 2A and partial cut-away of plate 222, to show certain features and general orientation of components. Approximately one-fourth of the arcuate wall 216 is shown, with spaced-apart ports 217 (two shown through partial cut-away of plate 222) arranged centered along a radial plane that includes the centerline of a respective transition 230. As so viewed, an inboard side 231, an outboard side 232, and lateral sides 233 and 234 of one of the transitions 230 are identified. Also depicted is a forward edge 224 of plate 222 disposed to meet the outer portion 219 of the arcuate wall 216, and extending aft to an aft edge 226 meeting the portion 221.

As shown in FIG. 2A, the portion 221 that the aft edge 226 contacts is along the horizontal 'floor' of the structure forming the plenum 220, but this contacting point is not meant to be limiting. For example, an aft edge alternatively may extend to engage or come in proximity to a vertical section 223 of structure forming the plenum 220 (i.e., see FIG. 3A regarding analogous structures).

The plate 222 depicted in FIG. 2B forms a unitary pressure boundary element that defines a confined space 225 (see FIG. 2A) with the arcuate wall 216 (more specifically, with that portion of the arcuate wall 216 inboard of the outer portion 219 juxtaposed with the forward edge 224). Alternatively, the pressure boundary element may be comprised of a plurality of sectional plates. Each such sectional plate may be curved so as to form a section of a truncated cone, or a plate may alternatively be flat with a trapezoidal shape to provide a longer forward edge and a shorter aft edge, so as to form, with other similar plates, a pressure boundary element circumferentially around a section of the plenum. A pressure boundary element formed of a unitary or a plurality of such sectional plates provides a boundary for a secondary portion of air passing through the ports 217, confining such air, and ultimately permitting passage of most or all of such secondary portion of air through apertures 246 (see FIG. 2C) of the plate or plates. It is noted that various joints may be used to connect the lateral sides 226 of adjacent sectional plates (i.e., butt joint, lap joint, etc.), or these may be joined along a strut, and/or welded or bolted together. As to the downstream connection to a structure within the plenum 220 (e.g., 221 in FIG. 2A), any connection means as know to those skilled in the art may be utilized, and, alternatively, a space may be left for passage of air, such as to further cool the aft end 234 of the transition 230.

FIG. 2C depicts an array 244 of apertures 246 on an outboard surface 245 of a portion of plate 222. The array 244 of the apertures 246 may be of any suitable design to achieve a desired pattern of airflow below and between the transitions. For example, an array of apertures may be designed to provide a desired level of cooling along the inboard side of an adjacent transition, and to provide a substantially uniform velocity of air between adjacent transitions, along the length of such transitions. Without being bound to a particular theory, this is believed to result in greater efficiency by minimizing the sudden expansion pressure loss on the outboard side of the respective transition. This may be accomplished while also providing for cooling of the outboard sides of the transitions, such as by approaches described herein.

Also, it is noted that a selected array of apertures may also result in providing sufficient airflow to the forward ends of the transitions to supplement the cooling effect of the primary portion of airflow from the opening of the curved diffuser.

Figure 3B:
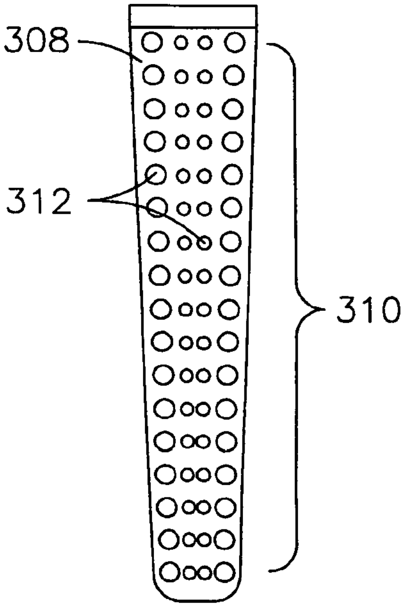
FIG. 3B provides a top outboard view of the conduit depicted in FIG. 3A.

As an alternative to the above-described plate-type pressure boundary element, a plurality of conduits may be utilized. One example of this is depicted in FIG. 3A. FIG. 3A provides a side cross-section view of a section 300 of a gas turbine engine taken through a port 304 of a curved diffuser 302. Attached to provide fluid communication with the port is a conduit 306, which comprises apertures 312 to provide a secondary portion of airflow for impingement cooling of a transition 320. FIG. 3B provides a top view of the conduit 306, showing that the conduit 306 comprises an outboard surface 308 upon which is arranged an array 310 of the apertures 312. As viewable in FIG. 3A, the conduit 306 is oriented with respect to the transition 320 such that the array 310 of apertures 312 is at a distance 317 that is effective, under a desired range of operating conditions, to provide impingement cooling to the adjacent inboard side 322 of the transition 320.

Figure 3C:
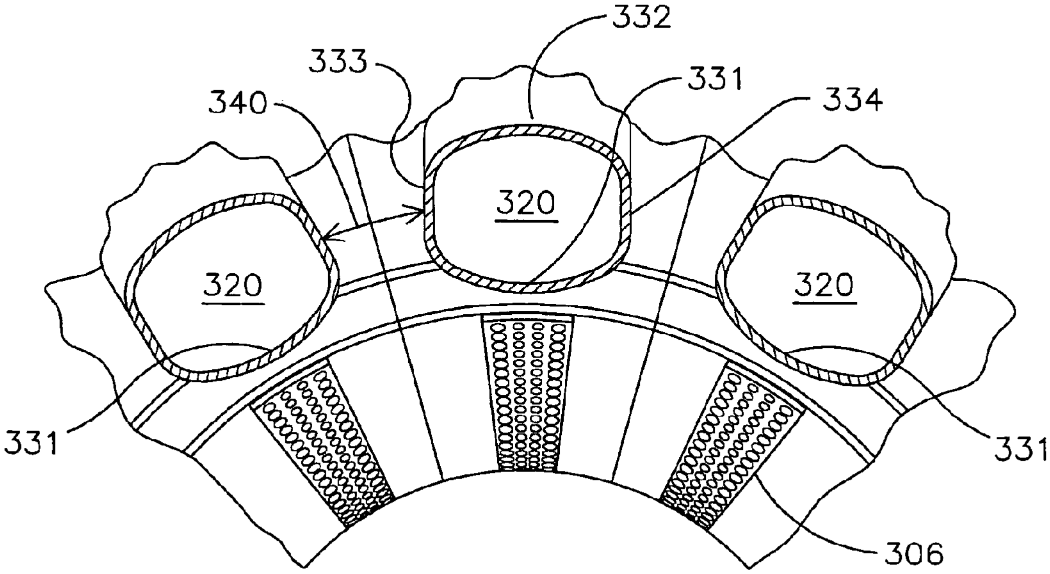
FIG. 3C provides a schematic upstream-directed view from the line A-A of FIG. 3A, with the transitions sectioned at line B-B of FIG. 3A.
Figure 3A:
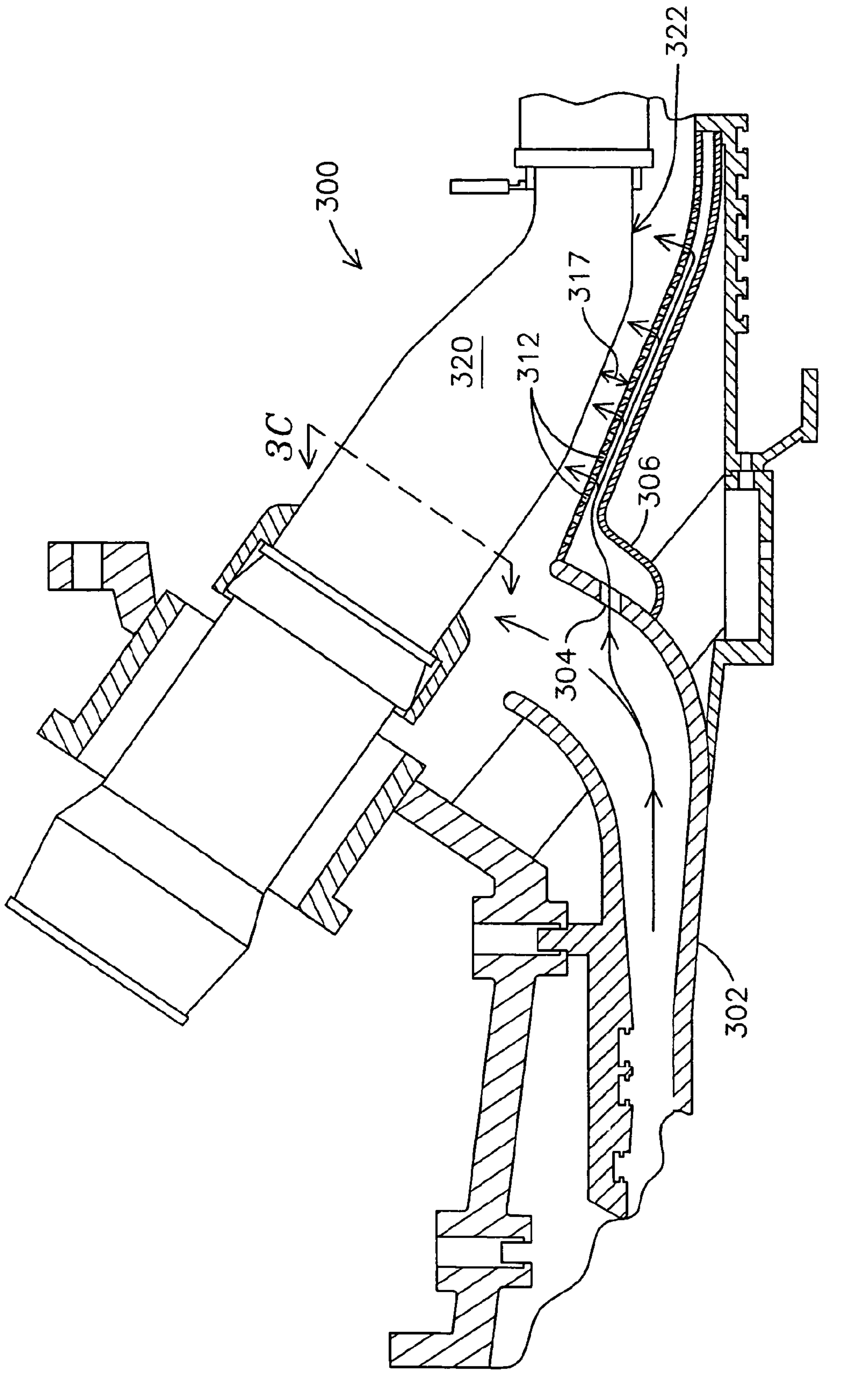
FIG. 3A provides a side cross-section view of a section of a gas turbine engine taken through a port of a curved diffuser, depicting a conduit-type embodiment of the present invention.

FIG. 3C provides a schematic upstream-directed view from the line A-A of FIG. 3A, with the transitions sectioned at line B-B of FIG. 3A. FIG. 3A depicts an embodiment in which each conduit 306 is centered below a respective transition 320. A distance between the adjacent surfaces of the respective conduit 306 and transition 320 is selected so as to provide for a desired level of impingement cooling to inboard surfaces 331 of the respective transitions 320. Cooling of lateral sides 333 and 334 of transition 320 may be effectuated by a selected level of airflow from apertures 312 that are positioned laterally along the outboard surface 309. A top surface 332 of each respective transition 320 is selectively cooled by any of the approaches described elsewhere in this disclosure.

Additionally, it is appreciated that the array 310 of apertures 312 may be designed so that airflow in the spaces 340 between adjacent transitions 320 flows at a substantially uniform speed along the upstream to downstream length of these spaces 340.

Figure 4A:
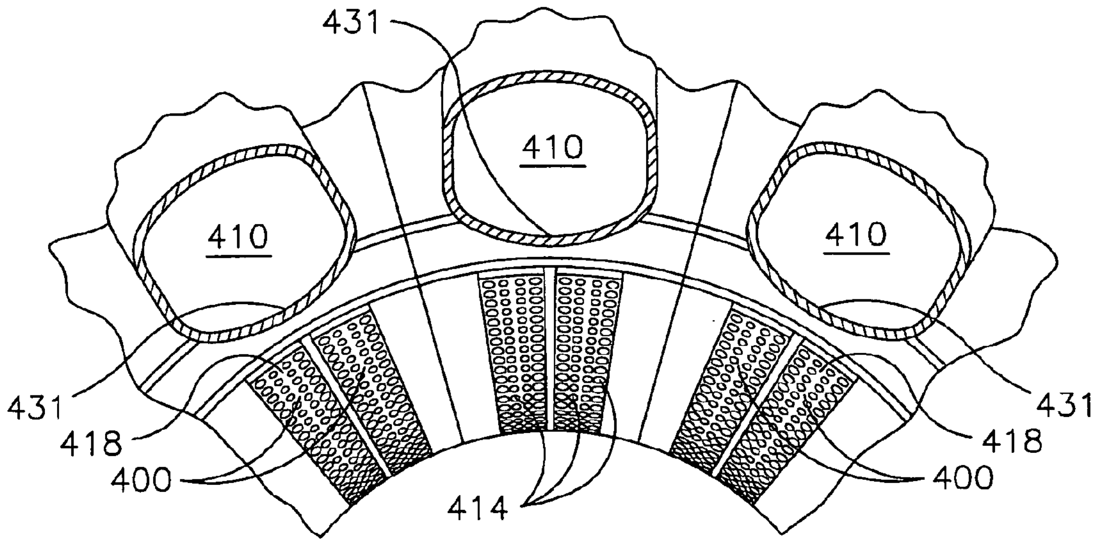
FIGS. 4A and 4B depict alternative arrangements of conduits and respective transitions using the same type of side cross-section view as used in FIG. 3C.
Figure 4B:
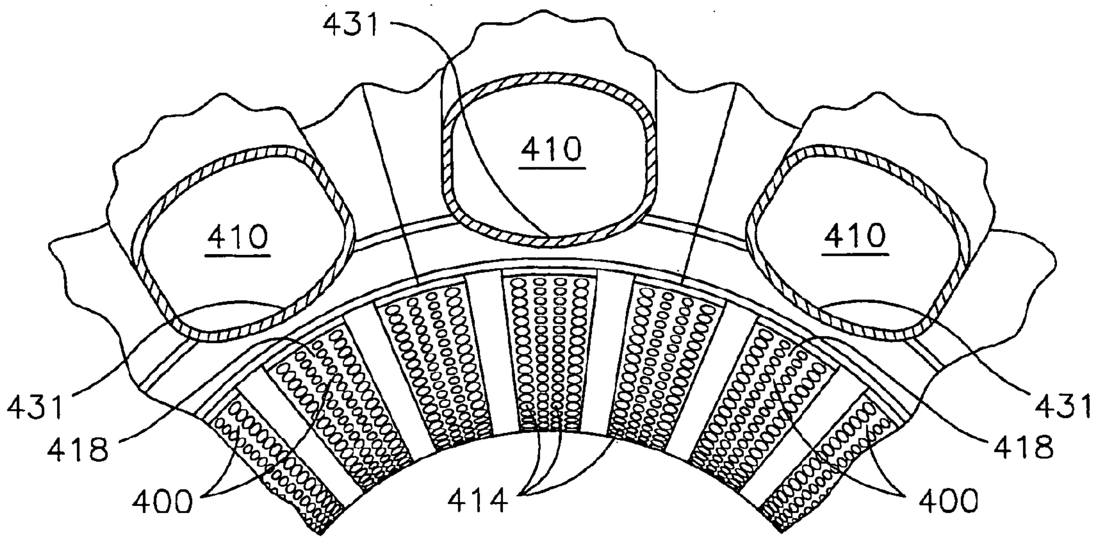

The arrangement in FIG. 3C of the conduit 306 in spatial orientation to the respective transition 320 is not meant to be limiting. For example, FIGS. 4A and 4B depict other arrangements of conduits and respective transitions using the same view as in FIG. 3C. FIG. 4A depicts two conduits 400 below each respective transition 410, each conduit 400 positioned inboard and centered at about ⅓ the width of the transition 410 from a respective lateral side 433 or 434 of transition 410. Apertures 414 on the outboard surface 418 of the conduits 400 are arranged to provide impingement cooling to inboard surface 431 of respective transitions 410, and also to provide uniform velocity airflow between adjacent transitions 410 when airflow from adjacent conduits is considered. In FIG. 4B are depicted central conduits 450 respectively positioned directly inboard of respective transitions 460, and intermediate conduits 470 positioned along the spaces between adjacent transitions 460. In this configuration airflow from intermediate conduits 470 primarily is directed between the adjacent transitions 460, whereas airflow from apertures (not shown) on central conduits 450 is directed to impingement cool the respective transitions 460.

Each conduit depicted in FIGS. 4A and 4B may be supplied by a single port (not shown, refer to FIG. 3A), or alternatively may be supplied by two or more ports (not shown). Also, as used herein, the term “conduit” is not meant to be limiting to cylindrical forms such as tubes or pipes. Conduits as used herein may have any desired cross-sectional configuration. It is appreciated that the contour varies along the length of a transition based on specific determined criteria.

Through the examples of embodiments in FIGS. 2A through FIG. 4C, it is appreciated that a pressure boundary element may be comprised of one or plates, or may be comprised of a plurality of conduits disposed about the curved diffuser. In various embodiments the airflow through the pressure boundary element may comprise between about ten to about 20 percent of the total airflow from the compressor. In other embodiments the airflow through the pressure boundary element may comprise between about ten to about 30 percent of the total airflow from the compressor.

While the term ‘pressure boundary element’ has been used above, it is appreciated that the plates and conduits described above and depicted in the figures also function as, and may be considered flow-directing members. More particularly, a flow-directing member comprises a structure with apertures directing airflow in a desired direction. More specifically, these plates and conduits direct airflow against a respective transition to cool, for example (not to be limiting) to impingement cool, the transition.

Further, through such examples and the above disclosure it is apparent that combinations of a curved diffuser, providing a primary portion of compressed air more directly to combustion chamber intakes, and comprising ports to supply a secondary portion of air to impingement cool major areas of the transitions, solve the balancing problem of airflow efficiency and transition cooling. That is, embodiments of the present invention provide functionally split airflow to achieve such solution. The benefits resulting from such solution include greater turbine efficiency and efficient transition cooling. The following additional comments regarding supplemental cooling approaches are not meant to diminish the value of the solutions provided by embodiments of the present invention.

In that there is relatively narrow spacing between the aft ends of transitions, where the pieces connect to the turbine inlet, various approaches may be utilized to achieve sufficient cooling in connection with embodiments of the present invention. These approaches may include partial open cooling, in which a relatively small percentage of the total volume of compressed air enters channels at this end of the transitions, travels a distance to effectuate cooling of a critical area, and then enters the transition, joining the flow of combusted gases. It also is noted that the dimensions of a particular conduit, and the respective array of apertures on it, may provide for a relatively high level of air flow at the aft end of the conduit, so as to provide a relatively high rate of convective cooling at the aft end of a respective transition.

Also, in the above exemplary embodiments, ports through the aft wall of the curved diffuser supply air to a confined space inboard of the pressure boundary element (i.e., the plates or conduits) and downstream of the arcuate wall of the curved diffuser. Such confined space receives compressed air that thereafter passes through apertures arranged in the selected pressure boundary element, such that these apertures are disposed a distance from a transition. However, the selected plate(s) or conduit(s) do not extend the entire length of the transition, as the curved diffuser occupies a portion of the upstream portion of transition, that portion being cooled in part by the substantial airflow from emanating from the curved diffuser. Supplemental cooling structures and approaches may be employed, as needed, to cool such upstream portions of the transition, and also to provide additional cooling to the outboard sides of the transitions.

Accordingly, it is noted that the upstream portions and/or outboard sides of the respective transitions may be provided with additional cooling approaches in order to achieve a desired level of cooling under specific operating conditions. The following provides a non-exclusive summary of possible approaches to such cooling. First, there may be provided a plurality of passages through the surface to provide for air from the plenum to enter a respective transition. This air could travel through short passages disposed at an angle into the transition interior (e.g., effusion cooling), or travel in a longer passage (e.g., a channel) along the transition wall and then into the transition interior, to both cool and provide a local internal region of cooler air. As is typical of various open systems known in the art, there also may be provided such cooling passages within the lateral side and/or outboard walls of the transition through which the air flows prior to entry into the transition. This allows for additional cooling of those walls.

Alternatively, a forced or confined convection cooling approach may be utilized. One example of this is described in U.S. Pat. No. 4,903,477, issued Feb. 27, 1990 to G. P. Butt. This patent is incorporated by reference for the teachings of this approach to convection cooling of the upper lateral sides and outboard side of the transition. As taught in U.S. Pat. No. 4,903,477, a generally C-shaped saddle is positioned a distance from and generally conforms to the outside shape of the upper lateral sides and outboard side. Air enters the sides of the saddle, passes close to the surfaces of the noted side sections of the transition, thereby providing for convective cooling, and exits the saddle through perforations along a centerline of the saddle (see FIGS. 2-4 of U.S. Pat. No. 4,903,477). Other configurations of forced or confined convection cooling may be employed based on the particular cooling needs of a particular gas turbine engine.

All patents, patent applications, patent publications, and other publications referenced herein are hereby incorporated by reference in this application in order to more fully describe the state of the art to which the present invention pertains, to provide such teachings as are generally known to those skilled in the art, and to provide teachings specific to embodiments of the present invention that utilize combinations of features that include one or more features and/or components described in the referenced patent applications.

Also, it is appreciated that a method of providing a functionally split airflow of compressed air in a gas turbine engine may include the steps of: 1) providing a primary portion of the airflow through a curved end of a diffuser, the curved end disposing the primary portion in a direction toward intakes of combustion chambers; and 2) providing a secondary portion of the airflow through ports disposed along the curved end and then through an array of apertures of a pressure boundary element, wherein the array of apertures is effective to provide a substantially uniform speed of air along lengths of transitions of the gas turbine engine, and wherein the secondary portion is effective to impingement cool portions of the transitions.

Finally, it should be understood that the examples and embodiments described herein are for illustrative purposes only. Thus, while some specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

I claim as my invention:

1. A gas turbine engine comprising:

a. an air compressor;

b. a plurality of combustion chambers, each comprising an intake end and an outlet end, and connected in parallel with respect to airflow;

c. a plurality of transitions, each comprising an inboard side, two lateral sides, and an outboard side, and each associated with a respective combustion chamber, providing fluid communication between the respective outlet end and an entrance port of a turbine;

d. a curved diffuser in fluid communication between the compressor and a plenum surrounding the transitions, comprising an inboard wall and an outboard wall defining an annular passage for air therebetween, the inboard wall and outboard wall together being effective to direct a primary portion of total airflow from the compressor to the intake ends, additionally comprising a plurality of spaced apart ports disposed along the inboard wall for passage of a secondary portion of the total airflow; and e. at least one pressure boundary element directing the secondary portion through at least one array of apertures on said at least one pressure boundary element, the respective apertures of sizes and spacing effective to provide a desired degree of impingement cooling to the at least one transition, wherein the inboard wall and the pressure boundary element define a confined space through which a secondary portion of the total airflow flows between the port and the apertures for said impingement cooling.

2. The gas turbine engine of claim 1, wherein the primary portion comprises at least 60 percent of the total airflow.

3. The gas turbine engine of claim 1, wherein the primary portion comprises at least 75 percent of the total airflow.

4. The gas turbine engine of claim 1, wherein the at least one pressure boundary element comprises a plate.

5. The gas turbine engine of claim 1, wherein the at least one pressure boundary element comprises a plurality of plates.

6. The gas turbine engine of claim 1, wherein the at least one pressure boundary element comprises a conduit, and one of the at least one array of apertures is positioned on an outboard side of said conduit.

7. The gas turbine engine of claim 1, wherein the at least one pressure boundary element comprises a plurality of conduits, and one of the at least one array of apertures is positioned on an outboard side of each said conduit.

8. The gas turbine engine of claim 7, wherein each of the plurality of conduits is arranged inboard of a respective one of the plurality of transitions.

9. The gas turbine engine of claim 7, wherein two of the plurality of conduits are arranged inboard of a respective one of the plurality of transitions.

10. The gas turbine engine of claim 7, wherein one of the plurality of conduits is arranged inboard of a respective one of the plurality of transitions, and wherein one of the plurality of conduits is arranged inboard between two adjacent transitions of the plurality of transitions.

11. An airflow-directing assemblage for a gas turbine engine comprising: a. a compressor; b. a combustion chamber; c. a transition configured to permit fluid communication from the combustion chamber to a turbine; d. a diffuser, directing total airflow from the compressor, comprising an annular arcuate inboard wall adapted to direct a primary portion of total airflow from the compressor to the combustion chamber, additionally comprising a port through the inboard wall for passage of a secondary portion of the total airflow; and e. a pressure boundary element, comprising an array of apertures and disposed a distance from the transition effective to provide impingement cooling through the apertures for the transition, wherein the apertures are in fluid communication with the port, and wherein the inboard wall and the pressure boundary element define a confined space through which the secondary portion of the total airflow flows between the port and the apertures for said impingement cooling.

12. The airflow-directing assemblage of claim 6, wherein the primary portion comprises at least 60 percent of the total airflow.

13. The airflow-directing assemblage of claim 6, wherein the primary portion comprises at least 75 percent of the total airflow.

* * * * *